(12) United States Patent
Price et al.

(10) Patent No.: US 9,248,769 B2
(45) Date of Patent: Feb. 2, 2016

(54) CARPET FLOOR MAT HAVING PLASTIC MIGRATING PREVENTION FORMATION, AND ASSOCIATED INJECTION MOLD

(71) Applicant: THERMOFLEX CORPORATION, Waukegan, IL (US)

(72) Inventors: Robert A. Price, Glencoe, IL (US); Michael J. Milella, Jr., Richmond, IL (US); David A. Reband, Antioch, IL (US); Karl J. Mazur, Richmond, IL (US); Robert M. Miller, Chicago, IL (US)

(73) Assignee: Thermoflex Corporation, Waukegan, IL (US)

( * ) Notice: Subject to any disclaimer, the term of this patent is extended or adjusted under 35 U.S.C. 154(b) by 151 days.

(21) Appl. No.: 13/905,388

(22) Filed: May 30, 2013

(65) Prior Publication Data

US 2013/0260083 A1    Oct. 3, 2013

Related U.S. Application Data

(63) Continuation-in-part of application No. 12/850,931, filed on Aug. 5, 2010, now Pat. No. 8,454,873.

(51) Int. Cl.
*B60N 3/04* (2006.01)
*B29C 45/14* (2006.01)
(Continued)

(52) U.S. Cl.
CPC .......... *B60N 3/048* (2013.01); *B29C 45/14065* (2013.01); *B29C 45/14336* (2013.01); *B29C 45/14786* (2013.01); *B29C 45/26* (2013.01); *B60N 3/044* (2013.01); *B60N 3/046* (2013.01); *B29C 2045/14155* (2013.01); *B29C 2045/14934* (2013.01); *B29L 2031/7324* (2013.01); *Y10T 428/23979* (2015.04)

(58) Field of Classification Search
CPC .......... B06N 3/04; B06N 3/046; B06N 3/048; B06N 3/048; B32B 2471/04; B29L 2013/7324; Y10T 428/23929; Y10T 428/23979
USPC .................................... 428/95, 88; 296/97.23
See application file for complete search history.

(56) References Cited

U.S. PATENT DOCUMENTS 3,129,972 A * 4/1964 Vodra .......................... 296/97.23
4,403,895 A * 9/1983 Caldwell et al. .............. 411/378
4,491,556 A 1/1985 Fujii et al.
(Continued)

FOREIGN PATENT DOCUMENTS

DE   3712882 A1   11/1988
EP   1614584 A2   1/2006

OTHER PUBLICATIONS

International Search Report from International Application No. PCT/US2014/039930, dated Apr. 7, 2015.

*Primary Examiner* — Cheryl Juska
(74) *Attorney, Agent, or Firm* — Greer, Burns & Crain, Ltd.

(57) ABSTRACT

An injection molded carpet mat includes a flexible base having an upper surface defining a carpet recess, and an opposite lower surface. A carpet sheet is secured in the carpet recess by being integrally formed with the base, and having a napped top surface, a bottom surface and a peripheral edge. The lower base surface having a plurality of spaced ribs supporting the carpet bottom surface adjacent the peripheral edge and defining a track on the lower base surface corresponding to the peripheral edge of the carpet sheet.

10 Claims, 15 Drawing Sheets

(51) Int. Cl.
*B29C 45/26* (2006.01)
*B29L 31/00* (2006.01)

(56) References Cited

U.S. PATENT DOCUMENTS

| | | | |
|---|---|---|---|
| 5,397,409 A | | 3/1995 | Kornylo |
| 5,891,546 A | * | 4/1999 | Sherman .................. 428/88 |
| 5,919,324 A | | 7/1999 | Moffitt et al. |
| 6,027,782 A | * | 2/2000 | Sherman .................. 428/88 |
| 6,479,006 B1 | | 11/2002 | Kaufmann |
| 6,605,333 B2 | * | 8/2003 | Ferreira et al. .................. 428/95 |
| 7,524,389 B2 | | 4/2009 | Elbs et al. |
| 7,546,661 B2 | | 6/2009 | Connor, Jr. |
| 8,658,269 B1 | * | 2/2014 | Parkes et al. .................. 428/88 |
| 8,991,006 B2 | * | 3/2015 | Masanek, Jr. .................. 16/4 |
| 2001/0020316 A1 | * | 9/2001 | Ferreira et al. .................. 15/215 |
| 2002/0028313 A1 | * | 3/2002 | Blum et al. .................. 428/54 |
| 2003/0044548 A1 | * | 3/2003 | Kaufmann .................. 428/14 |
| 2004/0224130 A1 | * | 11/2004 | Melucci et al. .................. 428/156 |
| 2005/0191459 A1 | * | 9/2005 | Ferreira et al. .................. 428/95 |
| 2010/0212119 A1 | * | 8/2010 | Dendo .................. 24/453 |
| 2012/0034409 A1 | | 2/2012 | Price et al. |
| 2013/0260083 A1 | | 10/2013 | Price et al. |

\* cited by examiner

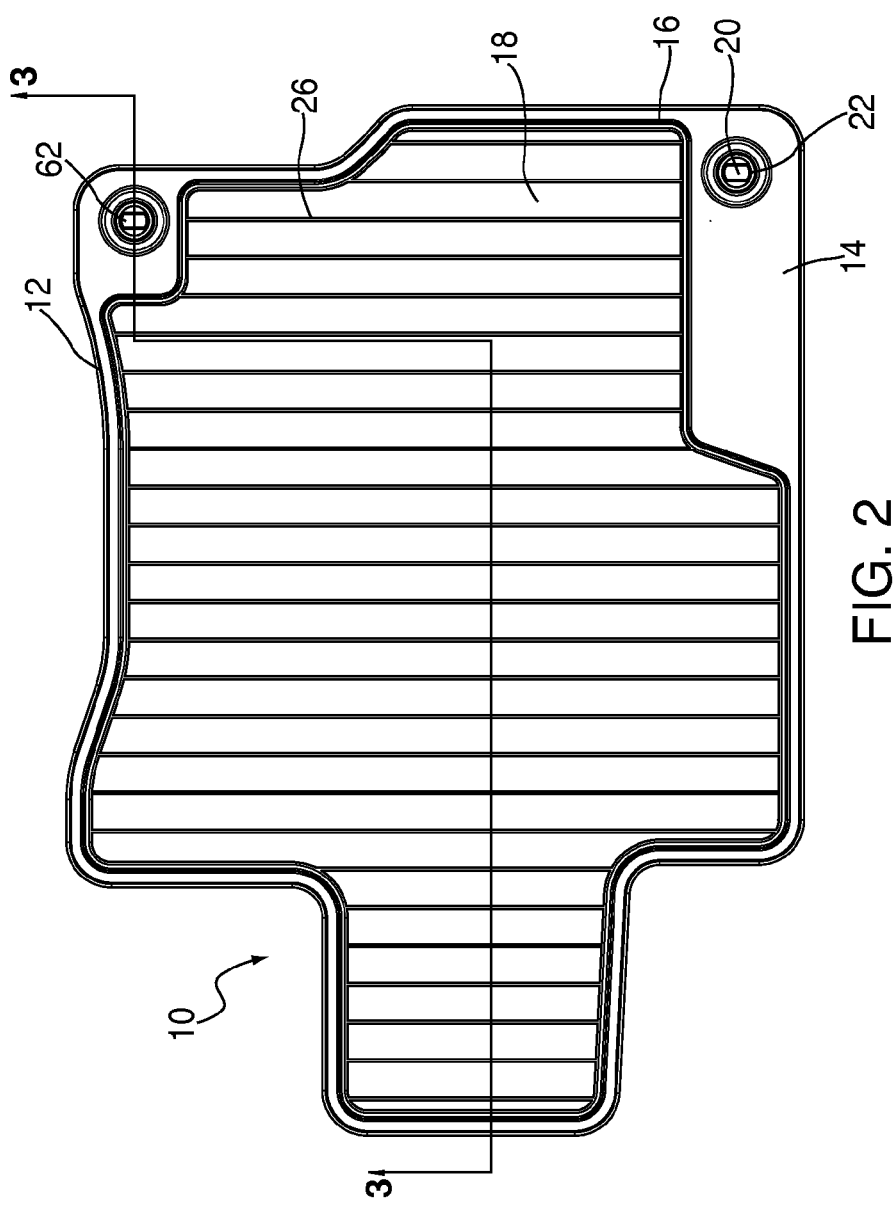
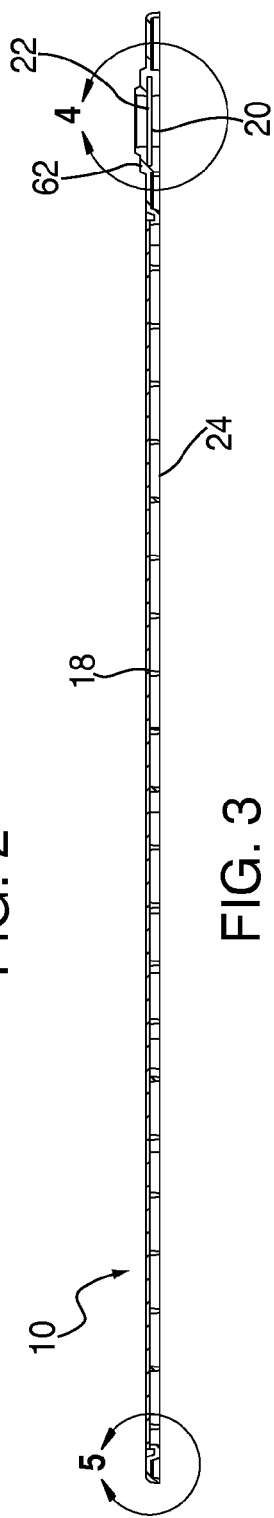

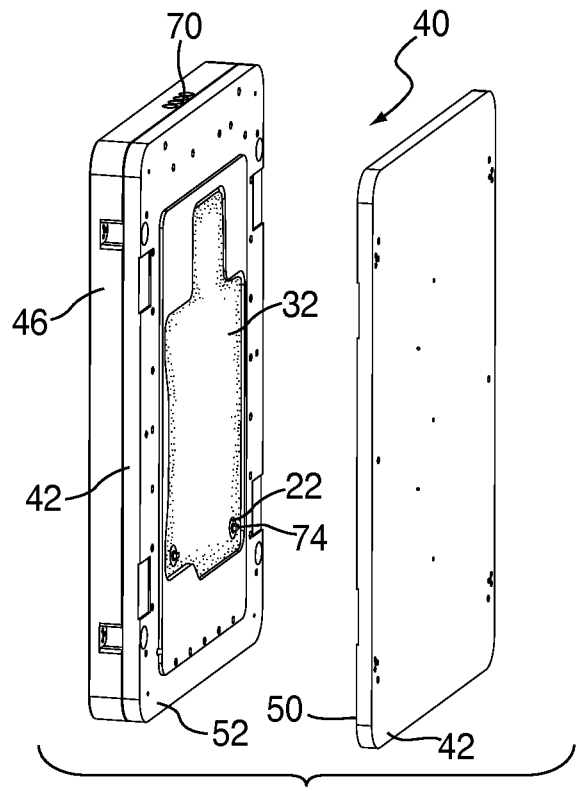
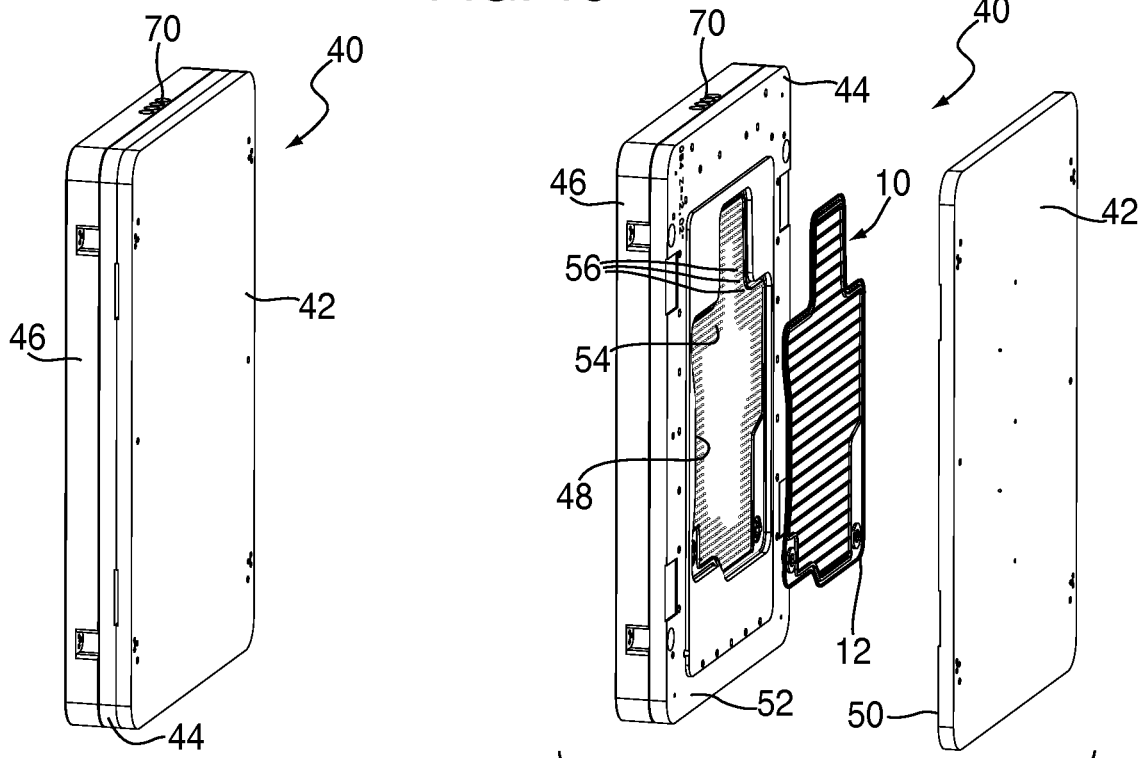

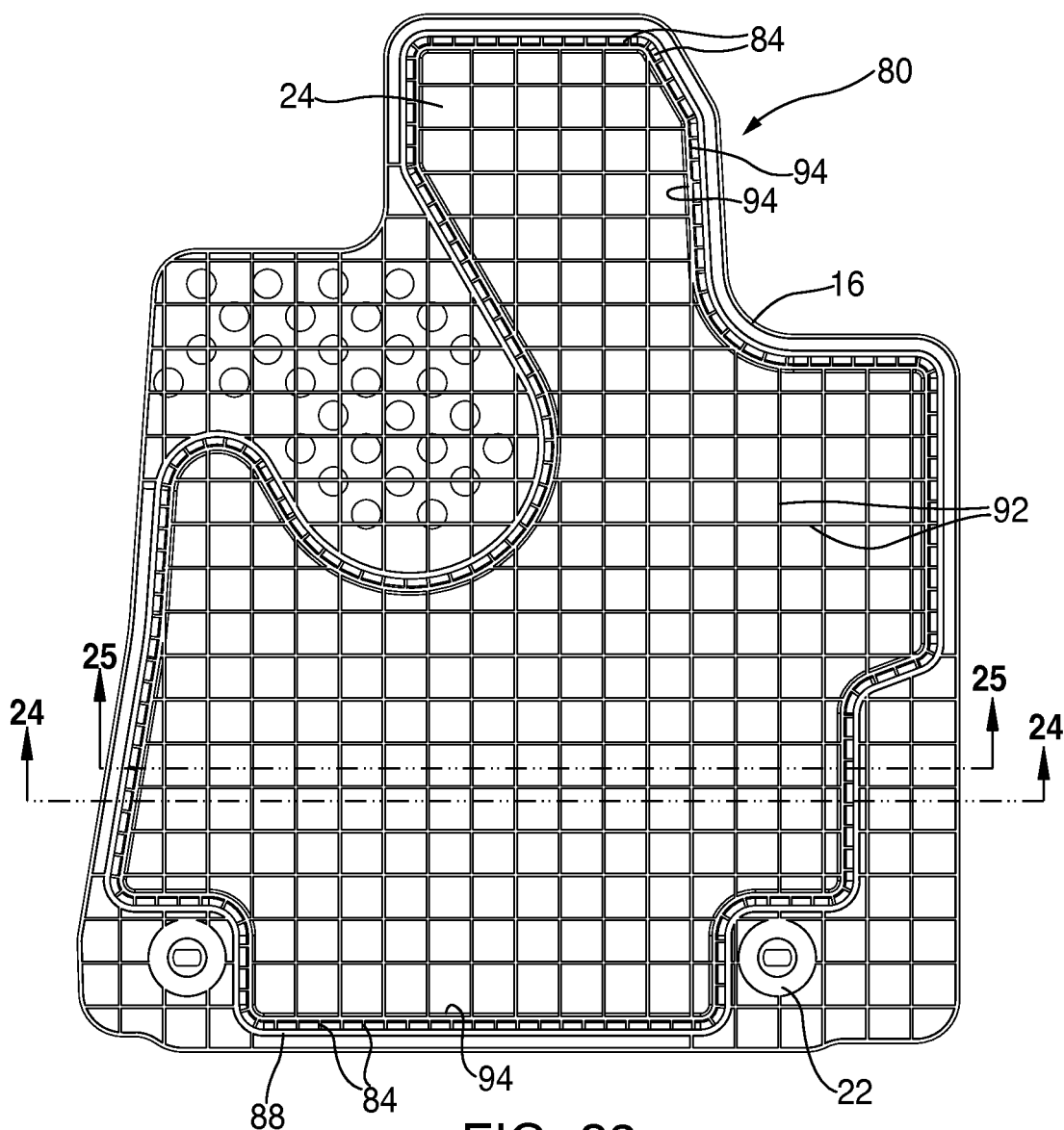
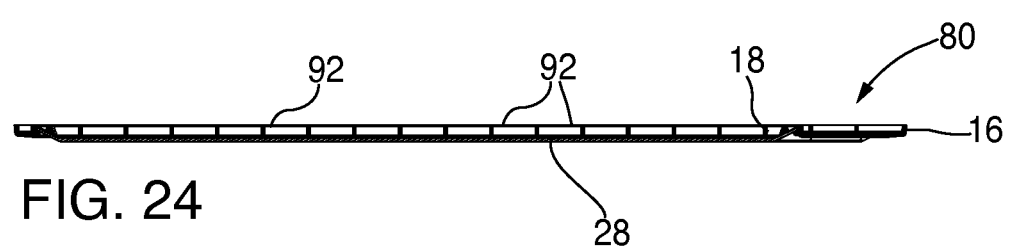
FIG. 24
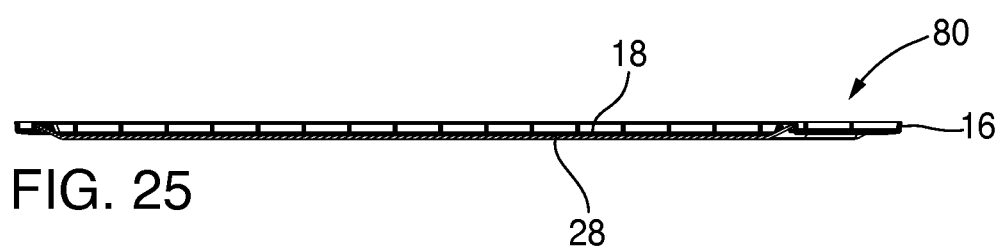
FIG. 25

CARPET FLOOR MAT HAVING PLASTIC MIGRATING PREVENTION FORMATION, AND ASSOCIATED INJECTION MOLD

RELATED APPLICATION

This application is a CIP of, and claims 35 USC §120 priority from, U.S. Ser. No. 12/850,931 filed Aug. 5, 2010 and entitled FLOOR MAT WITH INTEGRALLY MOLDED CARPETING, AND ASSOCIATED INJECTION MOLD now U.S. Pat. No. 8,454,873.

BACKGROUND OF THE INVENTION

The present invention relates to floor mats designed for being laid upon existing flooring, such as used in vehicles for protecting carpeting. More specifically, the present invention relates to an improved floor mat provided with carpeting, and a process for making same.

Conventional floor matting, as used in runners for commercial and residential flooring, involves laminating a web of carpeting upon a complementary web of rubber-like backing material. The two webs are adhered to each other using heat and/or chemical adhesives as is well known in the art. Such technology has been considered unsuitable for vehicle floor mats due, among other things, to the tendency for the carpeting to become detached from the backing material during normal use, especially at the peripheral edges.

Thus, overlay mats or lining carpets for vehicles are conventionally beaded. This beading is generally not detrimental to the desired flexibility of the carpet edge. However, such beadings are costly to produce and, moreover, have a considerable tendency to become soiled. The lifetime of such a carpet mat is usually limited, typically because a beading has been damaged.

In view of this problem, vehicle carpet mats are conventionally produced by first producing a hard-wearing carrier material from plastic by injection molding. A decorative material, such as carpet cut to size, has to be fastened into this carrier material in a further operation, typically using chemical adhesives or heat. So that cutting tolerances in the carpet can be absorbed or colored, but also to make a reinforced border available for the carpet edge, the carrier material is preferably produced with an undercut. This undercut, on the one hand, solves the problem of the cutting tolerances, but, on the other hand, creates a new problem.

Injection molds with corresponding slide systems are typically required to produce a clean undercut with an overhang which is suitable for covering tolerances of at least several millimeters. Only with the aid of such slide systems is it possible to remove the ready-molded carrier material from the mold damage free. Moreover, carpet edges bordered in this way prove to be insufficiently flexible. Furthermore, the operation of gluing the decorative material onto the carrier material represents an additional increase in price of the final product, and the adhesive power of the glue has been known to decrease over time and with extended use. Another drawback of such techniques is that apertured grommets used to releasably secure these mats to the vehicle floor must be added by hand post-molding.

U.S. Pat. No. 4,491,556 discloses a method and a device for producing a carpet mat, with an injection-molding unit including two molds. At least one of the molds has a cavity for forming the edges of a mat underlay. The method involves fitting a carpet into this receiving depression and injecting a thermoplastic resin into the space behind the carpet to provide a mat underlay which is simultaneously connected to the carpet. The '556 patent recognizes the problems inherent with injection molding carpet mats, including that the flowing resin migrates into the carpeting, and that the heat of the mold thins or otherwise degrades the carpeting during the molding process. While the '556 disclosure allegedly resolved this problem, this technique has not been adopted by the commercial vehicle mat manufacturing industry.

SUMMARY

The above-listed needs are met or exceeded by the present injection molded carpet mat, featuring a web of carpet which is integrally formed with a supportive flexible mat. In the preferred embodiment, upper surfaces of the carpet and the surrounding mat are generally flush with each other. Further, the molds used to make such a mat are vertically oriented to face each other and separate along a vertical plane. Such disposition of the mold facilitates mass production and reduces mold cycle time. To retain the carpet web in position prior to the injection of liquid plastic, one half of the mold is subject to vacuum. The vacuum is maintained until the injection of the plastic and its eventual cooling and solidifying. A peripheral rib in the mold holds the carpet under pressure and also acts as a guard to prevent the migration of plastic into the carpeting. Further, a mold support landing is provided in the vacuum side of the mold to support an apertured vacuum plate to which the carpet is held upon the activation of vacuum.

More specifically, a method for producing a carpet mat by injection molding is provided and includes providing an injection mold including a cavity and a complementary core, each defining a portion of a mold recess for accommodating the finished carpet mat, providing the cavity with a surface having at least one vacuum opening bordered by a peripheral retaining barrier, applying vacuum to the cavity, inserting a sheet of carpet into the mold recess of the cavity and against the surface so that the carpet is in contact with the cavity, so that the carpet is held in the mold recess by the vacuum. Next, the cavity and core are closed together, thus sealing the recess, and a flowable supply of plastic is injected into the mold recess. Finally, the mold is opened after a specified period, allowing the plastic to at least partially solidify.

In another embodiment, an injection molded carpet mat is provided, including a flexible base having an upper surface defining a carpet recess, and an opposite lower surface, a carpet sheet secured in the carpet recess by being integrally formed with the base, and having a top surface and a bottom surface. The top surface of the carpet sheet is flush with the upper surface of the base.

In yet another embodiment, a mold for forming a carpet mat in which the mat is formed around the carpet, integrally forming the carpet with the mold, includes a core partially defining a recess for forming the mat; and a cavity partially defining the recess, and including a retaining barrier disposed about a periphery of a carpet portion of the recess, and a carpet support plate bordered by the barrier and having at least one vacuum opening.

In a further embodiment, an injection molded carpet mat includes a flexible base having an upper surface defining a carpet recess, and an opposite lower surface. A carpet sheet is secured in the carpet recess by being integrally formed with the base, and having a napped top surface, a bottom surface and a peripheral edge. The lower base surface having a plurality of spaced ribs supporting the carpet bottom surface adjacent the peripheral edge and defining a track on the lower base surface corresponding to the peripheral edge of the carpet sheet.

In yet a further embodiment, a mold is provided for forming a carpet mat in which the mat is formed around a sheet of carpet having a bottom surface and an opposite upper napped surface, the mold configured for integrally forming the carpet sheet with the mold. Included in the mold is a core partially defining a mat recess for forming the mat, a carpet recess within the mat recess, and the core having a plurality of spaced protrusion teeth projecting into the carpet recess and constructed and arranged for exerting pressure on the bottom carpet sheet surface adjacent a peripheral edge of the sheet. Also included in the mold is a cavity partially defining the mat recess, and including a retaining barrier disposed about the peripheral edge of the carpet recess, the barrier being complementary to a carpet-engaging surface of the teeth, and configured for receiving the nap surface of the carpet sheet, such that upon the carpet sheet being inserted into the recess, and the cavity and the core closed for molding, sufficient pressure is exerted upon the peripheral edge of the carpet sheet for preventing migration of molten plastic into the carpet nap. The carpet support plate is bordered by the barrier and has at least one vacuum opening.

In a still further embodiment, a method is provided for producing a carpet mat by injection molding. The method includes providing an injection mold including a cavity and a complementary core, each defining a portion of a mold recess for accommodating the finished carpet mat. Next, providing the cavity with a surface having at least one vacuum opening bordered by a peripheral retaining barrier, applying vacuum to the cavity, inserting a sheet of carpet into the mold recess of the cavity and against the surface so that the carpet is held in the recess by the vacuum. The method also includes providing a plurality of protrusion teeth in the core, the constructed and arranged for supporting the carpet sheet at an underside and along a peripheral edge, providing a complementary barrier in the cavity having a complementary inclined surface for receiving the peripheral edge of the carpet sheet, closing the cavity and core, thus sealing the mold recess, injecting a flowable supply of plastic into the mold recess. The protrusion teeth and the barrier exert sufficient pressure on upper and lower surfaces of the carpet mat at the peripheral edge for preventing migration of molten plastic into a nap surface of the carpet mat. After a specified period, the mold is opened, allowing the plastic to at least partially solidify.

BRIEF DESCRIPTION OF THE DRAWINGS

FIG. 2 is an overhead plan view of the mat of FIG. 1;
FIG. 3 is a cross-section taken along the line 3-3 of FIG. 2 and in the direction generally indicated;
FIG. 19 is an exploded perspective view of the carpet held in the cavity prior to molding;
FIG. 20 is a perspective view of the pressurized molding step;
FIG. 21 is an exploded perspective view of the mold opening and releasing the finished carpet mat;
FIG. 23 is a bottom plan view of the mat shown in FIG. 22;
FIG. 24 is a vertical cross-section taken along the line A-A of FIG. 23 and in the direction indicated generally;
FIG. 25 is a vertical cross-section taken along the line B-B of FIG. 2 and in the direction indicated generally.

DETAILED DESCRIPTION

Figure 1:
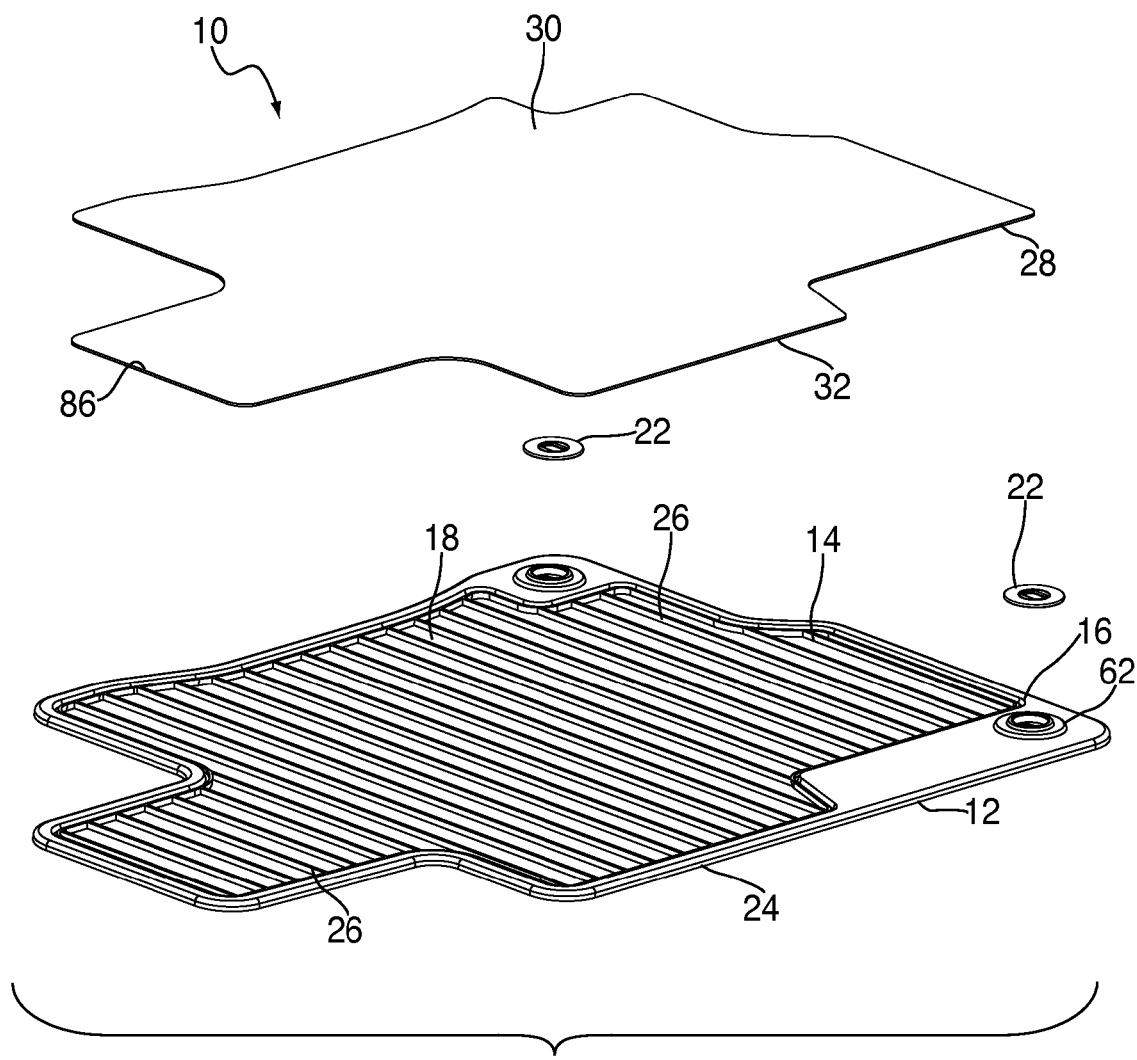
FIG. 1 is an exploded perspective view of the present carpet mat.

Referring to FIGS. 1-6, the present injection molded carpet mat is depicted and generally designated 10. A flexible base 12 is made of bendable, injection moldable materials, including but not limited to polypropylene, ABS copolymers, TPE, thermoplastic rubbers or the like, as are well known in the art. The base 12 has an upper surface 14 having a peripheral edge 16 defining a carpet recess 18. Also found on the peripheral edge 16 is at least one grommet aperture 20 provided with a grommet 22 used for securing the mat 10 to a lug on a vehicle floor as is known in the art (not shown). Opposite the upper surface 14 is a lower mat surface 24. As seen in FIGS. 1 and 2, the carpet recess 18 is preferably provided with a plurality of spaced, parallel ribs 26 for strength and more efficient use of material.

Figure 4:
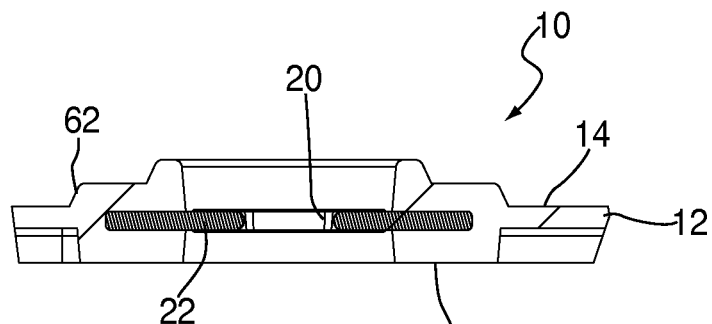
FIG. 4 is an enlarged fragmentary section marked '4' of the mat shown in FIG. 3.
Figure 5:
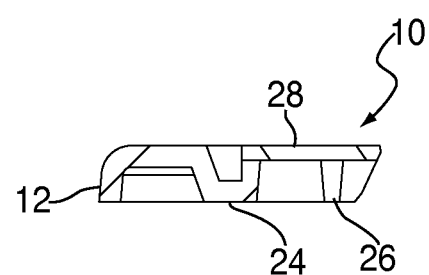
FIG. 5 is an enlarged fragmentary section marked '5' of the mat shown in FIG. 3.
Figure 6:
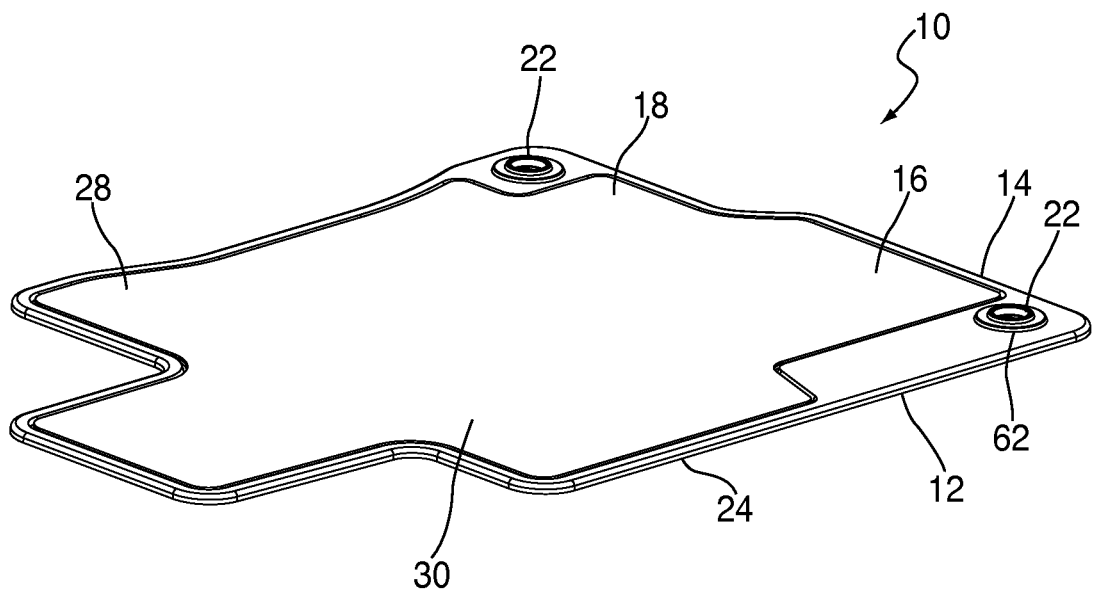
FIG. 6 is a top perspective view of the present carpet mat.

A sheet of carpet 28 is shaped to be inserted into the carpet recess 18, and has an upper nap side 30 and an opposite backing or attachment side 32. An important feature of the present mat 10 is that it is produced such that the base 12 is integrally formed around the carpet sheet 28 once the carpet has been placed in the mold, as will be described in greater detail below. In addition, the base 12 is preferably formed around the grommets 22. Once formed, the nap side 30 is flush with the upper surface 14 (FIGS. 5, 6). Further, the carpet sheet 28 is surrounded by the peripheral edge 16. As seen in FIG. 4, the grommet 22 is substantially encapsulated by the base 12.

Figure 7:
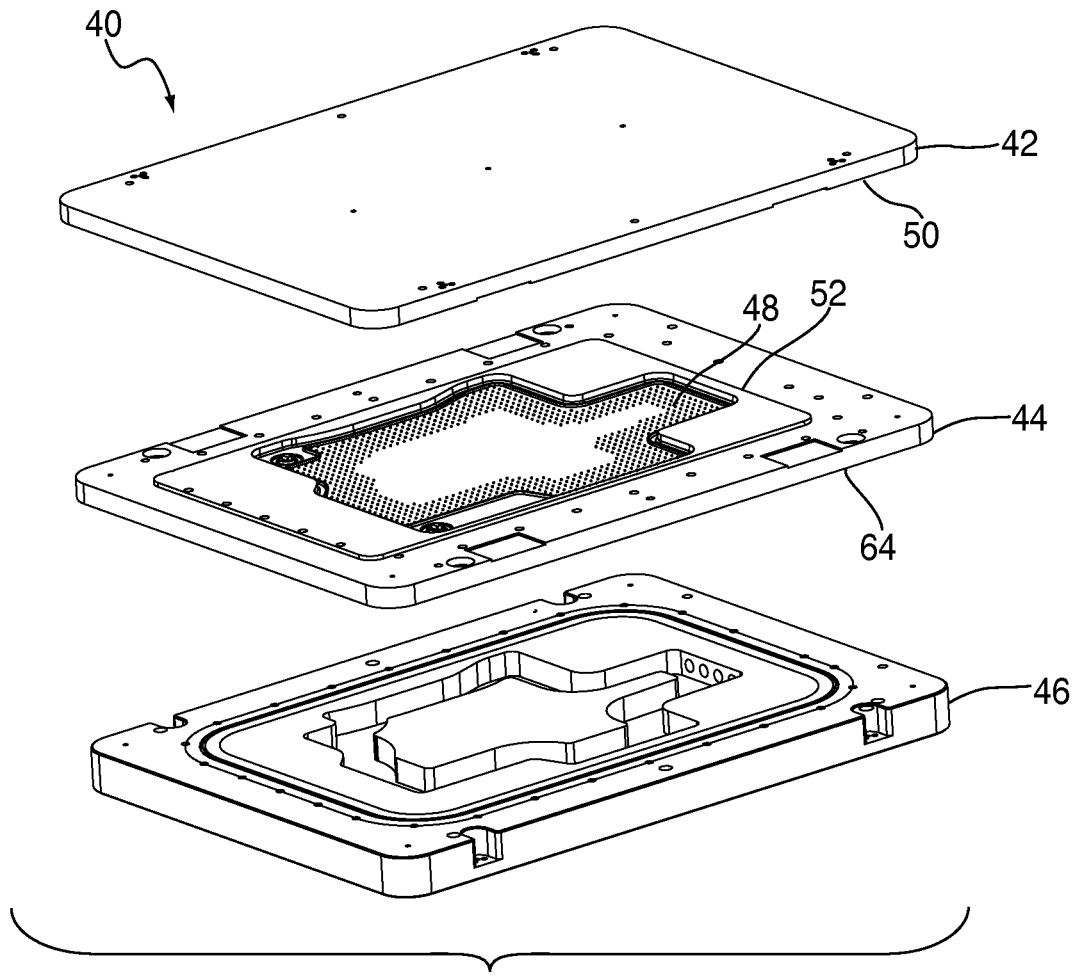
FIG. 7 is an exploded perspective view of the mold used for making the present carpet mat.

Referring now to FIGS. 7-16, and in particular FIG. 7, an injection mold suitable for use in manufacturing the present mat 10 is generally designated 40, and features three main components, a core 42, a cavity 44 and a backup plate 46. As is known in the art, the core 42 receives molten plastic through a sprue opening (not shown) which fills a mold recess 48 formed by opposing faces 50, 52 of the core and cavity 44 respectively. In the present application, the terms "core" and "cavity" are considered interchangeable and are generally intended to differentiate the main mold components defining the mold recess 48. The backup plate 46 provides support and vacuum to the cavity 44, as described below, and sandwiches the cavity between the plate and the core 42. Once placed in a conventional molding press (not shown), the assembled mold 40 is subjected to high-pressure clamping forces and the injection of molten flowing plastic material.

Figure 8:
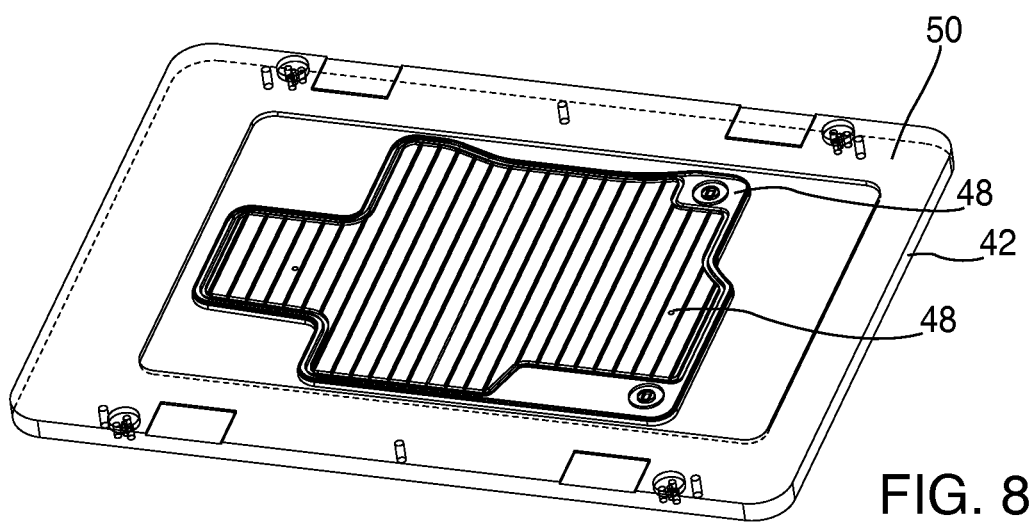
FIG. 8 is a top perspective view of the core portion of the mold.
Figure 9:
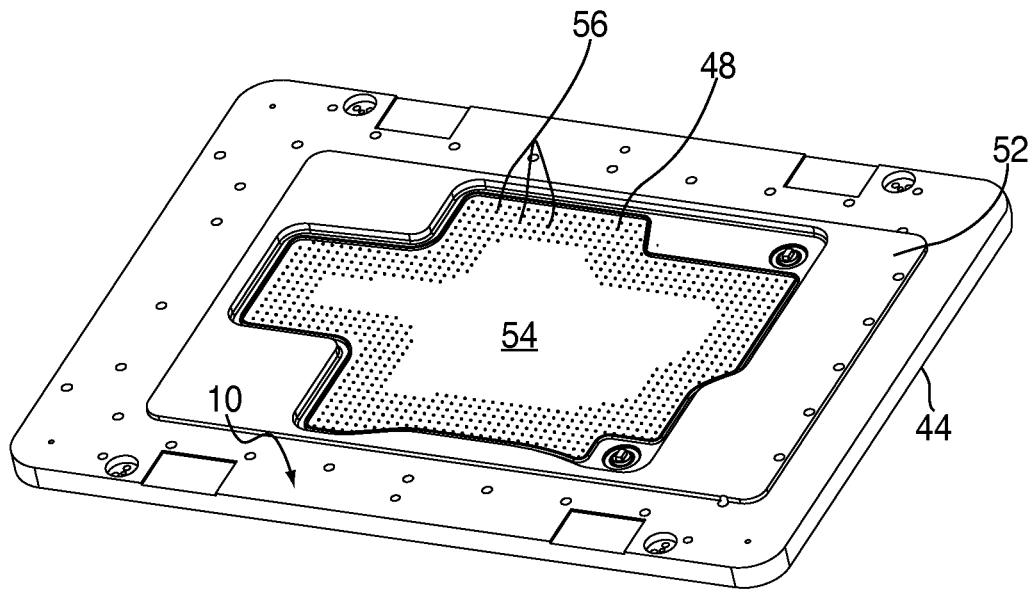
FIG. 9 is a top perspective view of the cavity portion of the mold.
Figure 10:
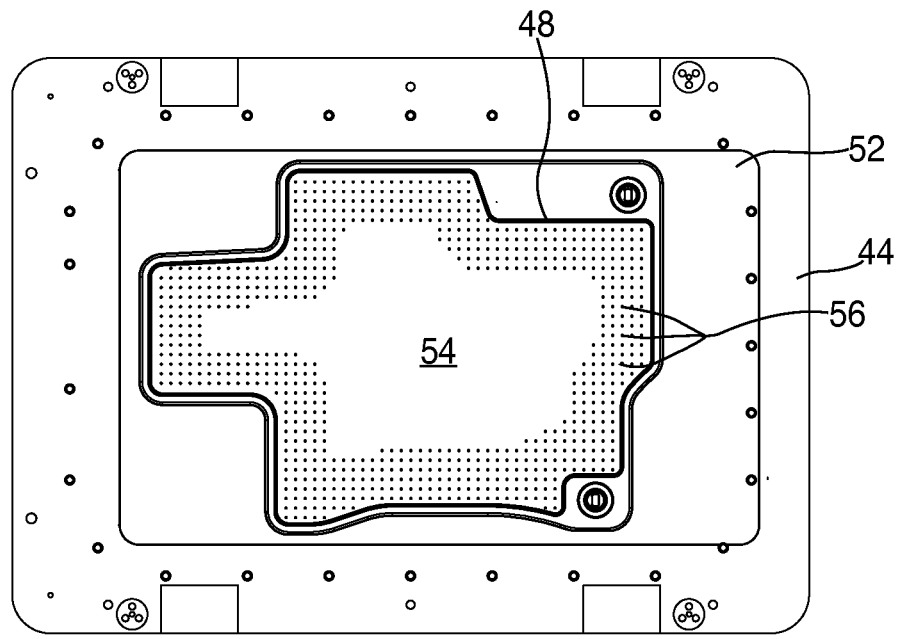
FIG. 10 is a top plan view of the cavity of FIG. 9.
Figure 11:
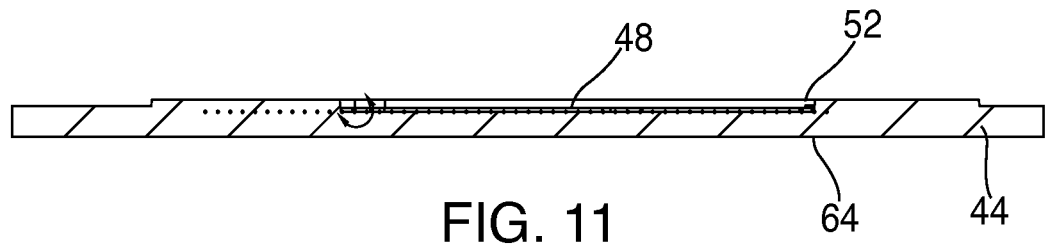
FIG. 11 is a cross-section taken along the line 11-11 of FIG. 10 and in the direction generally indicated.

Referring now to FIG. 8, the core face 50 is shown, with its share of the mold recess 48 having the inverse form of the mat base 12. Opposite the core 42, as seen in FIGS. 9-13 is the cavity 44. Designed to receive and retain the carpet sheet 28 during the molding process, the cavity 44 includes a carpet support plate 54 having at least one and preferably a plurality of vacuum openings 56. Bordering the carpet support plate 54 is a retaining barrier 58 disposed about a periphery of a carpet portion 60 of the mold recess 48. The cavity 44 also is configured for forming the upper mat surface 14, including bosses 62 surrounding the grommets 22.

Figure 12:
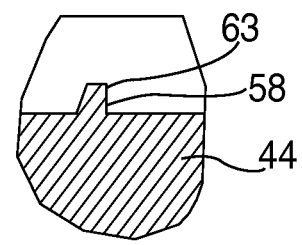
FIG. 12 is a fragmentary enlarged cross-section of the mold of FIG. 11.
Figure 13:
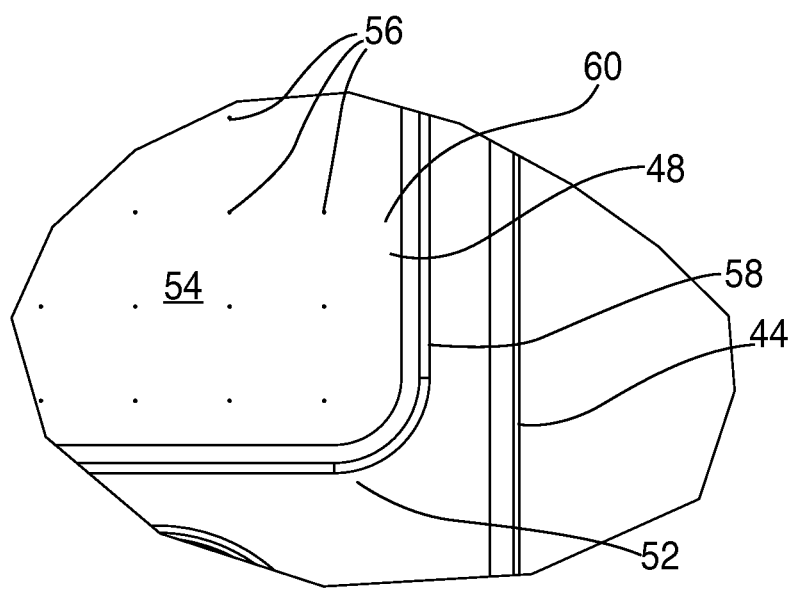
FIG. 13 is an enlarged fragmentary perspective view of the cavity of FIG. 9.
Figure 16:
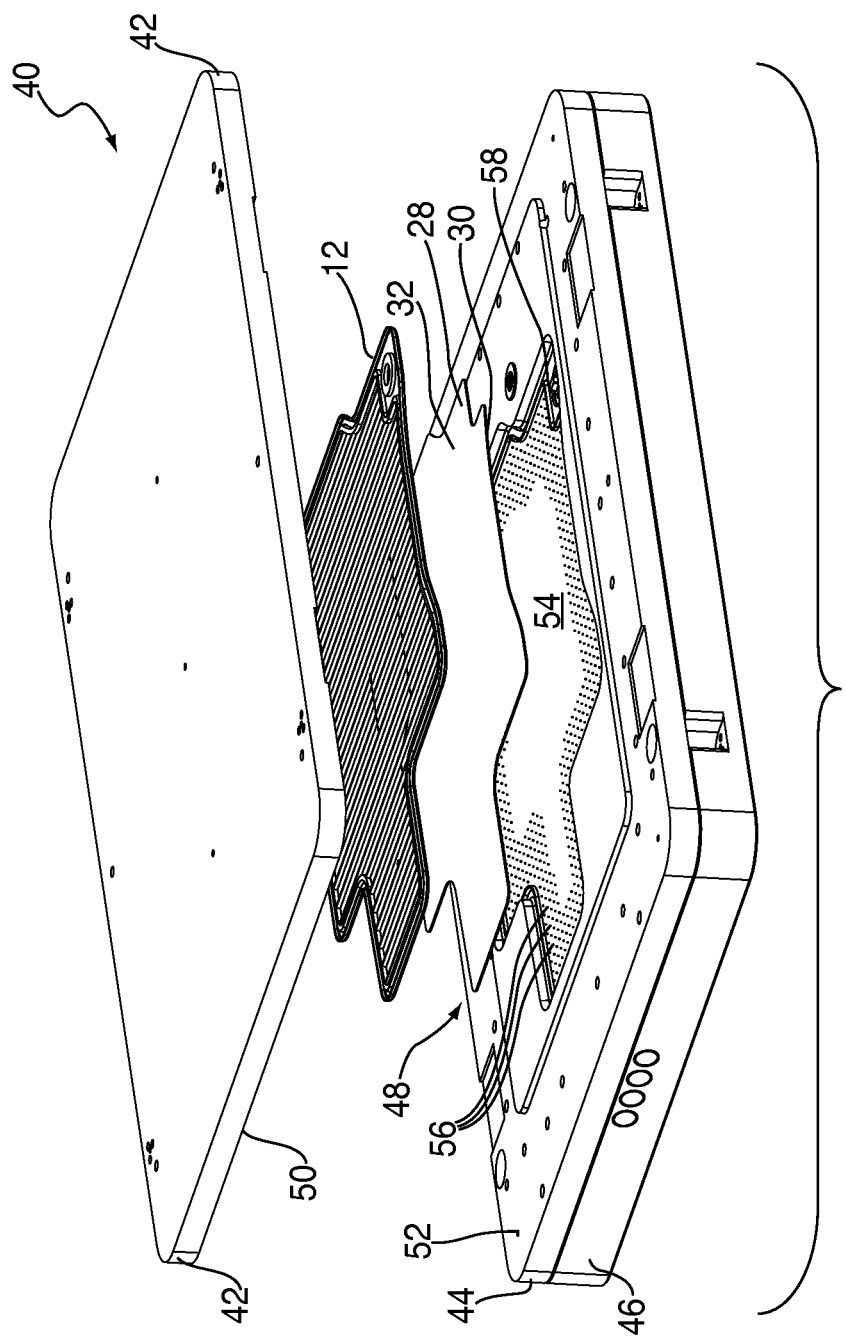
FIG. 16 is an exploded perspective view of the present carpet mat in the present mold.

Referring to FIGS. 12, 13 and 16, the retaining barrier 58 is dimensioned to hold the carpet sheet 28 in compression against the carpet support plate 54, with the nap side 30 contacting the support plate. In addition to compressing the carpet sheet 28 in place, upon assembly of the mold 40, the retaining barrier 58 is dimensioned to tightly engage the core 42 to prevent migration of the molten plastic into the carpeting during the molding process. As seen in FIG. 12, upon assembly of the mold 40, an edge 63 of the barrier 58 is in contact with the core 42 for protecting the carpet sheet 28 from unwanted contact with the molten plastic forming the mat base 12.

Figure 14:
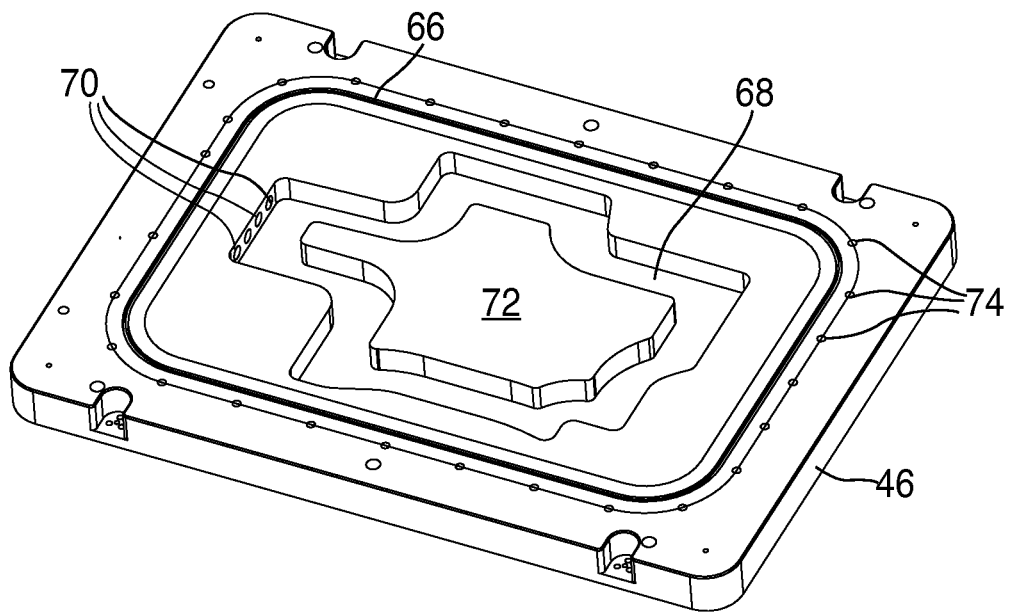
FIG. 14 is a top perspective view of the support plate of the present mold.
Figure 15:
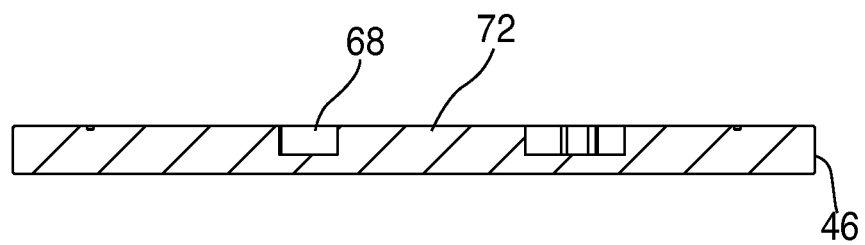
FIG. 15 is a cross-section taken along the line 15-15 of FIG. 14 and in the direction generally indicated.

Referring now to FIGS. 7, 14 and 15, the mold backup plate 46 is configured for tightly engaging a rear surface 64 of the cavity 44. Accordingly, a groove 66 is provided for receiving an O-ring (not shown) or sealing compound such as RTV silicone or the like for providing an airtight seal with the cavity 44. Within an area defined by the groove 66, a vacuum chamber 68 is in fluid communication with a plurality of vacuum ports 70. The vacuum chamber 68 is disposed on the backup plate 46 to be in registry with the perforated carpet support plate 54 on the cavity 44 upon assembly of the mold 40.

To support the cavity 44, and specifically the carpet support plate 54 for accommodating the pressurized injection of molten plastic into the mold 40, a mold support landing 72 is generally centrally located within and surrounded by the vacuum chamber 68. It will be appreciated that the support landing 72 may vary in configuration and disposition within the vacuum chamber 68 as long as it performs its support function. As seen in FIG. 15, the landing 72 is preferably an integral part of the backup plate 46. A plurality of bolt bores 74 surrounds the groove 66 and receives bolts (not shown) for attaching the backup plate 46 to the cavity 44.

Figure 17:
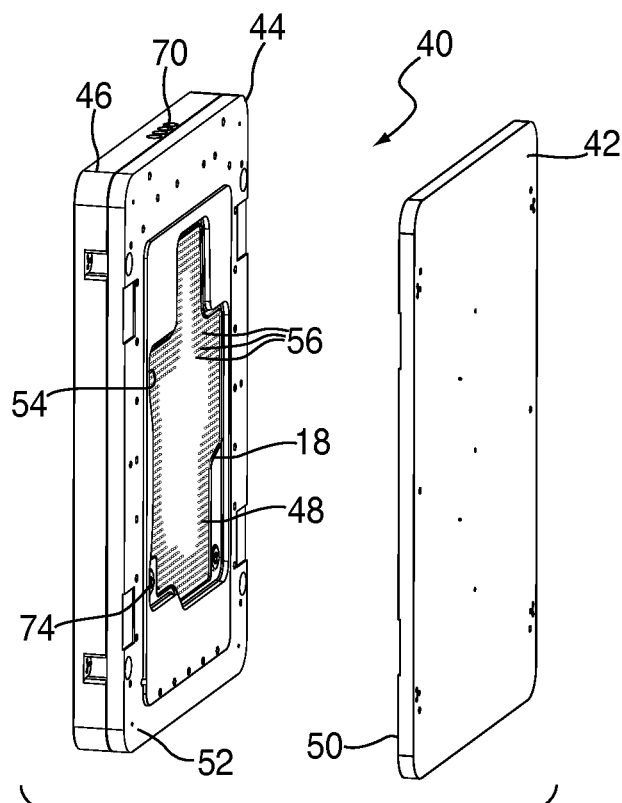
FIG. 17 is an exploded perspective view of the present mold in a first step of the mold cycle.

Referring now to FIGS. 17-21, a method for using the injection mold 40 to make the present carpet mat 10 is schematically illustrated. In FIG. 17, the mold 40 is shown with the backup plate 46 fastened to the cavity 44, and the core 42 spaced laterally away from the cavity. It is significant to note that the cavity 44 and the core 42 meet each other along a vertical plane. While shown schematically, it will be appreciated that each of the cavity 44 and the core 42 are attached to respective portions of a laterally or horizontally acting conventional injection molding press (not shown). This orientation is more efficient for producing mats in a mass production environment, and reduces mold cycle time since the mats are more easily removed from the mold 40.

Figure 18:
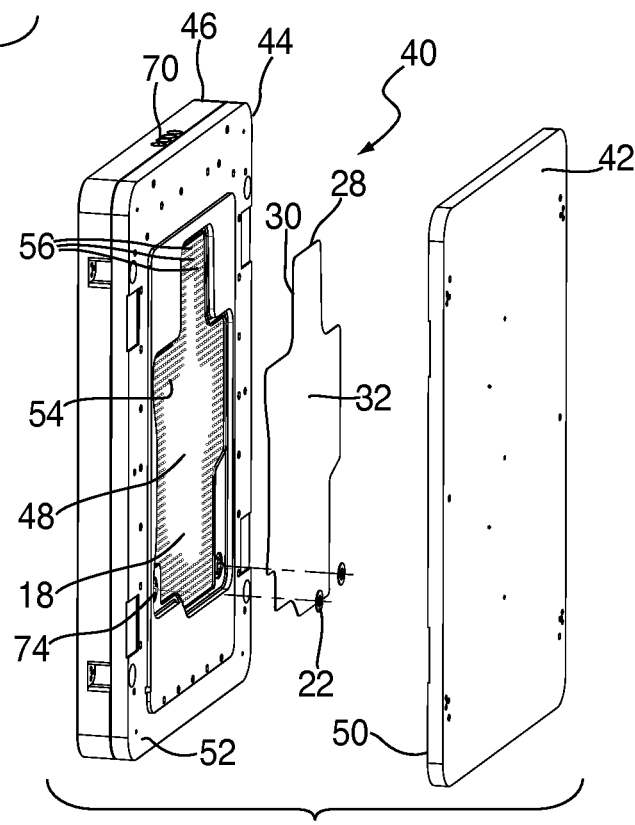
FIG. 18 is an exploded perspective view of a carpet insertion step in the present mold cycle.

Referring now to FIGS. 17 and 18, vacuum is applied to the backup plate 46, and the carpet sheet 28 is inserted within the carpet recess 18, located within the mold recess 48. Thus, the vacuum holds the carpet sheet 28 in place in the carpet recess 18. The carpet nap side 30 faces the carpet support plate 54 and the carpet backing side 32 faces the core 42. Sufficient vacuum is applied so that the carpet sheet 28 is compressed within the area defined by the retaining barrier 58. Also, at this time, the grommets 22 are located upon suitable grommet pegs 74. The application of the carpet sheet 28 and the grommets 22 may be accomplished manually or automatically.

As seen in FIGS. 19 and 20, once the carpet sheet 28 and the grommets 22 are in place, the molding press begins to close, as is known in the art. Vacuum is maintained in the backup plate 46 throughout this process to maintain the carpet sheet 28 in place under compression. Upon closing (FIG. 20), the mold recess 48 is sealed and a flowable supply of molten plastic is injected into the recess in conventional fashion.

Referring now to FIG. 21, after a specified period of time, during which the molten plastic at least partially solidifies, the mold 40 is opened through operation of the molding press. The completed mat 10 is then removed from the mold 40, either manually or automatically.

Referring now to FIGS. 22-25A, another embodiment of the present mat is generally designated 80. Shared components with the mat 10 are indicated with identical reference numbers. An important feature of the mat 80 is that, instead of the retaining barrier 58, special formations are provided for preventing the migration or infiltration of molten plastic into the nap surface 30 of the carpet sheet 28 during the molding process. This feature is obtained by complementary surfaces of the cavity 44 and the core 42 of the mold which exert clamping pressure on a peripheral edge of the carpet 28, and at the same time permitting sufficient plastic flow for forming a carpet edge-enclosing portion of the mat 80.

Included on the mat 80 is a flexible base 82 similar to the base 12, with an upper surface 14, a peripheral edge 16 and a carpet recess 18, as well as a lower mat surface 24. However, the flexible base 82 is provided with a plurality of spaced feed ribs 84 supporting the carpet bottom surface or attachment side 32 adjacent a peripheral carpet edge 86 and defining a track 88 on the lower base or mat surface 24 corresponding to the peripheral edge 86 of the carpet sheet 28. As will be described below, the ribs 84 are formed by a plurality of spaced protrusion teeth 90 preferably found on the core 42 but optionally found on the cavity 44. Pressure exerted by the protrusion teeth 90 on the carpet attachment side 32 prevents migration of molten plastic into the nap side 30.

As seen in FIG. 23, the track 88 on the mat base 82, defined by the spaced feed ribs 84, is distinct from the regular grid of checkerboard-oriented base support ribs 92 and in some cases the spaced feed ribs 84 project at angles relative to the support ribs. Also, the track 88 is defined by spaced, generally parallel border ribs 94 that generally correspond to the carpet edge 86.

Furthermore, it will be seen that the carpet sheet peripheral edge 86 is discontinuous with the outside edge 16 of the mat base 82. As is the case with the mat 10, the mat 80 has at least one grommet 22 integrally molded into the base 82. Also, the nap surface 30 of the carpet sheet 28 is generally flush with the upper mat surface 14.

Figure 24A:
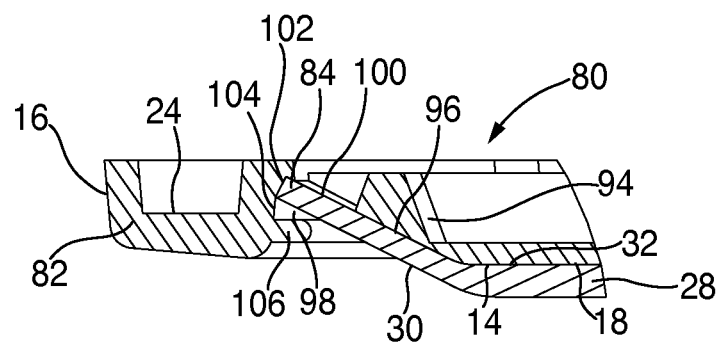
FIG. 24A is an enlarged fragmentary view of the mat seen in FIG. 24.
Figure 25A:
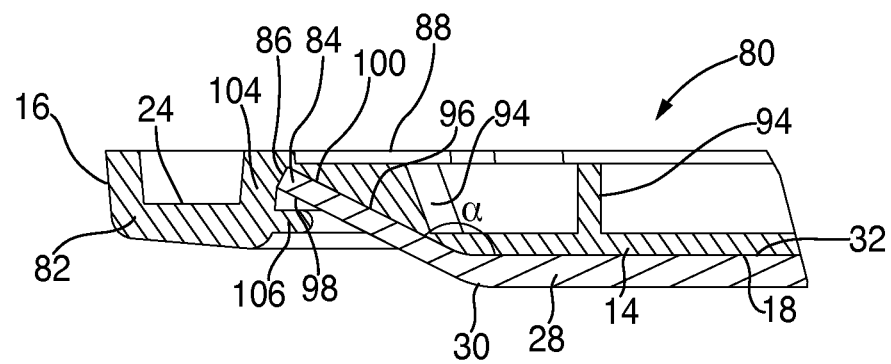
FIG. 25A is an enlarged fragmentary view of the mat seen in FIG. 25.
Figure 26:
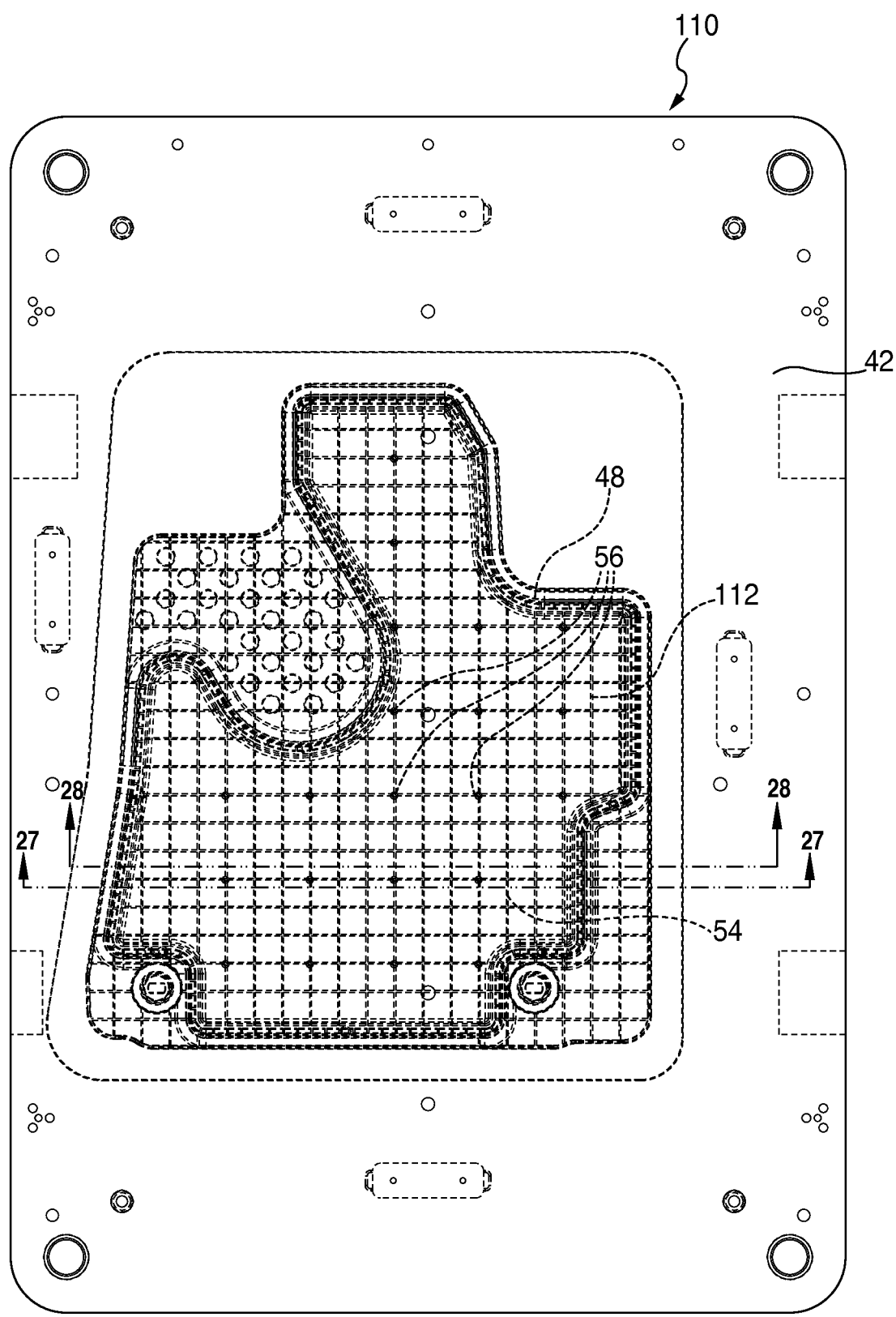
FIG. 26 is a top plan view of a mold suitable for producing the mat of FIG. 22.
Figure 28:
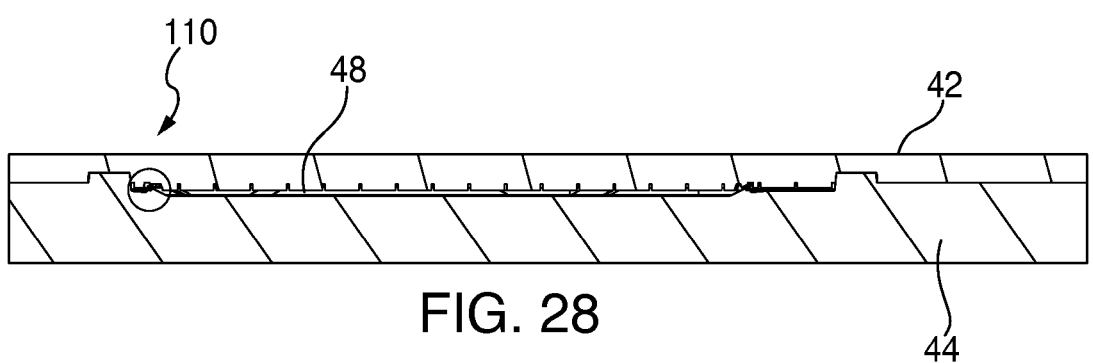
FIG. 28 is a vertical cross-section of the mold of FIG. 26 taken along the line B-B and in the direction generally indicated.

Referring now to FIGS. 24A and 25A, once the mat 80 is manufactured, the carpet sheet bottom surface or attachment side 32 is integrally formed with and is in contact with a corresponding upper surface 96 of each of the feed ribs 84. As is the case with the mat 10, the carpet attachment side 32 is manufactured using a plastic that is compatible with the molten plastic used to mold the mat, and as such, when exposed to the heat and pressure of the molding process, the carpet becomes integral with the mat. An important function of the feed ribs 84 is that they provide flow paths for molten plastic that forms the peripheral mat edge 16.

Another feature of the present mat 80 is that the upper base surface 14 defines a chamber 98 for accommodating the peripheral carpet edge 84, and a floor 100 of the chamber being defined by adjacent edges 96 of the ribs. As seen in FIG. 24A, the edges 96 taper towards the peripheral carpet edge 84, as well as toward the peripheral mat edge 16. Thus, the peripheral carpet edge 84 is angled relative to a main plane of the carpet defined by the mat 80, and the angle α corresponds to the tapered edge 96 of the feed ribs 84. Also, it is preferred that the carpet edge 84 generally abuts a corner 102 defined by the floor 100 and a normally extending wall 104, although other arrangements are contemplated.

The chamber 98 is also defined in part by a perimeter rib 106 projecting normally from an opposite end of the wall 104 from the floor 100, and projecting generally parallel to the floor 100, and also direction generally parallel to a plane defined by the base 82. A main feature of the perimeter rib 106, which extends about the entire peripheral carpet edge 86, is that it obscures the carpet edge, which during manufacturing is often unsightly due to the use of laser cutters or other cutting devices to form the edge and cut the carpet to size. Also, due to cost reasons, little effort is made to make the carpet edge 86 aesthetically pleasing.

Referring now to FIGS. 24A and 25A, comparing the two views, it will be seen that in the track 88, spaces between the feed ribs 84 are shown as not extending to the carpet edge 86.

Referring now to FIGS. 26-28A, a mold suitable for manufacturing the carpet mat 80 is generally designated 110. Components shared with the mold 40 are designated with identical reference numbers. A main distinguishing feature of the mold 110 over the mold 40 is that the former is configured for exerting pressure on peripheral edges of the carpet sheet 28 during the molding process for more effectively preventing the infiltration or migration of molten plastic into the nap surface 30.

Included in the mold 110 is the core 42, partially defining a mat recess 48 for forming the mat, a carpet recess 112 within the mat recess 48, and having a plurality of spaced protrusion teeth 90 (FIG. 27A) projecting into the carpet recess and constructed and arranged for exerting pressure on the bottom carpet sheet surface 32 adjacent the carpet sheet peripheral edge 86.

A mold cavity 44 partially defines the mat recess 48, and includes a retaining barrier 114 disposed about the peripheral edge of the carpet recess. The barrier 114 is complementary to a carpet-engaging surface 116 of the protrusion teeth 90, and is configured for receiving the nap surface 30 of the carpet sheet 28, such that upon the carpet sheet being inserted into the recess, and the cavity 44 and the core 42 closed for molding, sufficient pressure is exerted upon the peripheral edge 86 of the carpet sheet 28 for preventing migration of molten plastic into the carpet nap 30. As is the case with the mold 40, the carpet support plate 54 is bordered by the barrier 114 and has at least one vacuum opening 56.

Figure 22:
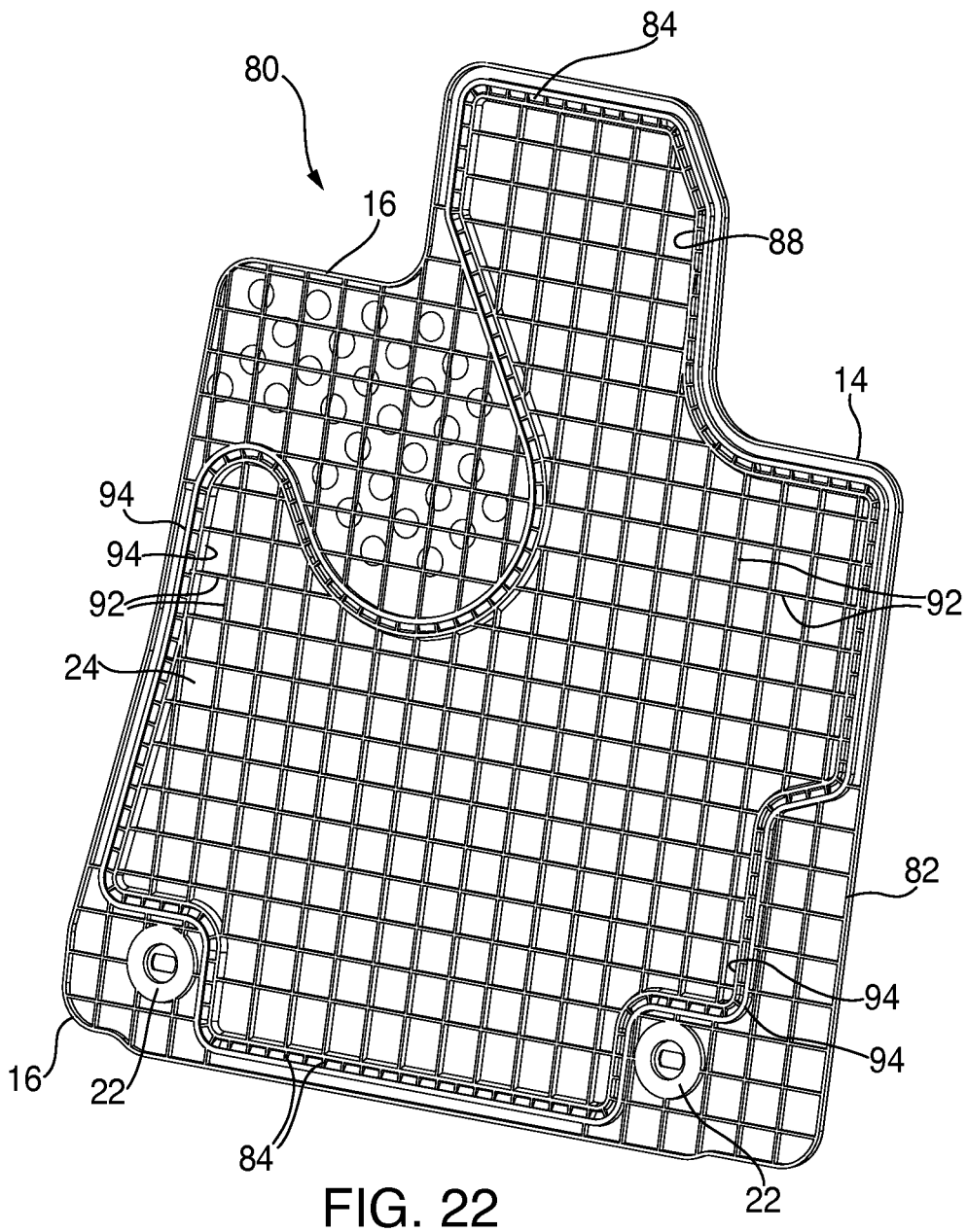
FIG. 22 is a bottom perspective view of an alternate embodiment of the present carpet mat.
Figure 22A:
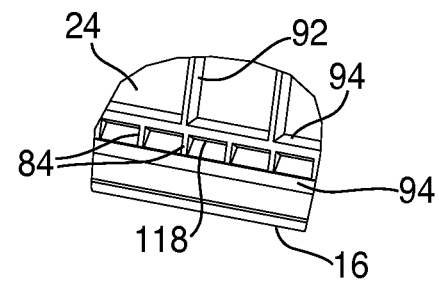
FIG. 22a is an enlarged fragmentary perspective view of the mat shown in FIG. 22.

Due to the well known aspects of the molding process, the projection teeth 90 will define voids 118 (FIG. 22A) between the feed ribs 84, and spaces 120 (FIG. 27A) between the teeth 90 will create the ribs 84 and also are flow channels for molten plastic during the mat forming process, which moves under pressure to form the mat peripheral edge 16.

Figure 27:
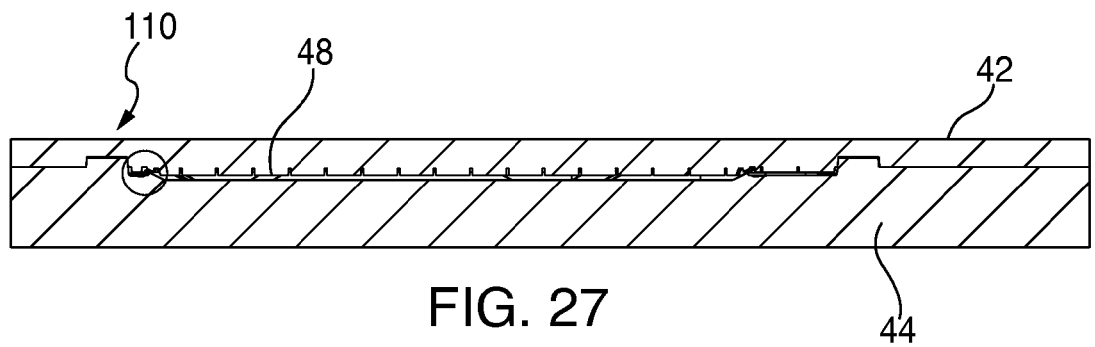
FIG. 27 is a vertical cross-section of the mold of FIG. 26 taken along the line A-A and in the direction generally indicated.
Figure 27A:
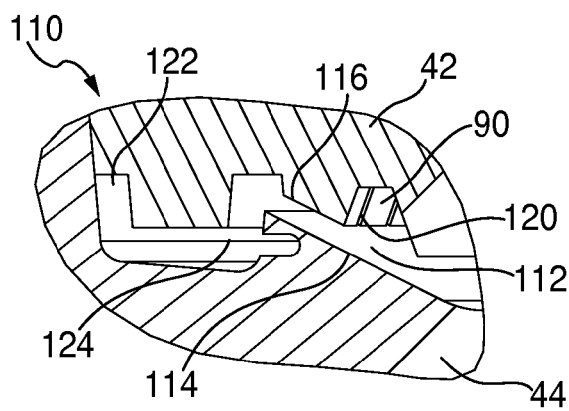
FIG. 27A is an enlarged fragmentary view of the mold of FIG. 27.
Figure 28A:
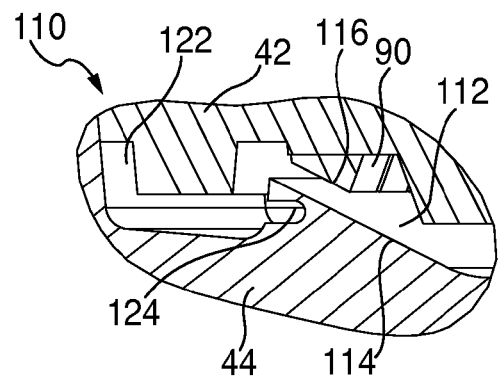
FIG. 28A is an enlarged fragmentary view of the mold of FIG. 28.

Referring now to FIGS. 27A and 28A, the projection teeth 90 preferably each have the recess-facing surface 116 inclined toward a periphery 122 of the mat recess, and the cavity barrier 114 has a complementary inclined surface for receiving the peripheral edge 86 of the carpet sheet 28 and retaining the edge at the angle α to a general plane defined by the mold 110.

In addition, the cavity 44 in the mold 110 includes an undercut 124 adjacent said retaining barrier and projecting generally parallel to a plane defined by the mold for creating the perimeter rib 106 in the resulting mat 80.

The process for producing the mat 80 is similar to that for the mat 10. The core 42 and the cavity 44 are each provided and configured for defining a portion of the mold recess 48 for accommodating the finished mat 80. Also the mold 110, and preferably the cavity 44 are provided with a surface having at least one vacuum opening 56 bordered by the peripheral retaining barrier 114. Once vacuum is applied to the cavity 44, the carpet sheet 28 is inserted into the mold recess and against the vacuum surface so that the carpet sheet is held against the surface by the vacuum. The protrusion teeth 90 are provided in the core 42 and are configured for supporting the carpet sheet 28 at the underside 32 and along the peripheral edge 86. In the cavity 44, the complementary barrier 114 has an inclined surface for receiving the carpet sheet peripheral edge 86.

Once the mold 110 is closed with the carpet sheet 28 held in place by vacuum pressure, the mold recess 48 is sealed, and molten plastic is injected into the mold recess 48, flowing from the center towards the mat periphery 16. The protrusion teeth 90 and the barrier 114 exerting sufficient pressure on upper and lower surfaces of the carpet sheet 28 at the peripheral edge 86 for preventing migration of molten plastic into a nap surface 30 of the carpet sheet. As the plastic cools and partially solidifies, the mold 110 is opened. As is the case with the mold 40, the mold 110 is oriented so that the cavity 44 and the core 42 meet along a vertical plane.

Thus, it will be seen that the present carpet mat 10, 80 embodies a superior production technique, which prevents molten plastic from flowing into the carpet sheet 28. Further, the use of vacuum to hold the carpet sheet 28 in place under compression during the molding process reduces mold cycle time and provides a more consistent product.

While a particular embodiment of the floor mat with integrally molded carpeting has been described herein, it will be appreciated by those skilled in the art that changes and modifications may be made thereto without departing from the invention in its broader aspects and as set forth in the following claims.

The invention claimed is:
1. An injection molded carpet mat, comprising:
   a flexible base having an upper surface defining a carpet recess, and an opposite lower surface;
   a carpet sheet secured in said carpet recess by being integrally formed with said base, and having a napped top surface, a bottom surface and a peripheral edge;

said lower base surface having a plurality of spaced ribs supporting said carpet bottom surface adjacent said peripheral edge; said base defining a track corresponding to said peripheral edge of said carpet sheet; and said upper base surface defines a chamber for accommodating said peripheral edge, a floor of said chamber being defined by adjacent edges of said ribs.

2. The carpet mat of claim 1, wherein said carpet sheet bottom surface is integrally formed with, and is in contact with a corresponding upper surface of each said rib.

3. The carpet mat of claim 1, wherein said ribs in vertical cross-section taper towards said peripheral edge.

4. The carpet mat of claim 3, wherein said peripheral edge of said carpet sheet is angled relative to a main plane defined by said mat, said angle corresponds to said taper of said ribs.

5. The carpet mat of claim 1, wherein said chamber is defined in part by a perimeter rib configured for obscuring said peripheral carpet sheet edge from view from said upper base surface.

6. The carpet mat of claim 5, wherein said perimeter rib extends about the entire peripheral edge of said carpet sheet.

7. The carpet mat of claim 5 wherein said perimeter rib extends in a direction generally parallel to a plane defined by said base.

8. The carpet mat of claim 1, wherein said carpet sheet peripheral edge is discontinuous with an outside edge of said base.

9. The carpet mat of claim 1 further including at least one grommet integrally molded into said base.

10. The carpet mat of claim 1 wherein a top surface of said carpet sheet is flush with said upper surface of said base.

* * * * *